Dec. 6, 1949     R. F. GARBARINI ET AL     2,490,044

MAGNETIC CLUTCH

Filed Feb. 14, 1947

INVENTORS
ROBERT F. GARBARINI
ROBERT S. EDWARDS
BY
Herbert H. Thompson
ATTORNEY.

Patented Dec. 6, 1949

2,490,044

UNITED STATES PATENT OFFICE 2,490,044

MAGNETIC CLUTCH

Robert F. Garbarini, Woodside, and Robert S. Edwards, Mineola, N. Y., assignors to The Sperry Corporation, a corporation of Delaware Application February 14, 1947, Serial No. 728,540

1 Claim. (Cl. 192—84)

This application is a continuation-in-part of our prior application Number 719,276, filed December 30, 1946.

This invention relates to a clutch and more particularly to a clutch of the electromagnetic type.

A feature of the invention is the provision of a clutch of simple design and small size particularly suitable for computing devices, such as those used for computing lead angles in fire control devices.

Another feature of the invention is the provision of an electromagnetic clutch in which the windings are stationary thereby eliminating moving contact arrangements in the circuits therefor.

Still another feature of the invention is the provision of a clutch structure which may be adapted for either of two purposes by a slight modification of the parts assembled therein. For example, in one modification, the driven member when disengaged is locked automatically against rotation; in the other modification, the driven member is free to turn on being disengaged from the driving member.

A further feature of the invention is the provision of a clutch structure in which the input and output shafts may be made of small diameter which permits the use of very small as well as large gears thereon.

A still further feature of the invention is the provision of a simple clutch structure in which but one stationary winding is required to control the coupling and uncoupling of the driven member with the driving member.

Other features and advantages of the invention will be found in the following description, given with the aid of the accompanying drawings, of which, Fig. 1 shows one modification of a clutch, partly in section, the parts being in disengaged position;

Figs. 1 to 3 are drawn to double scale for the sake of greater clarity.

Figure 1:
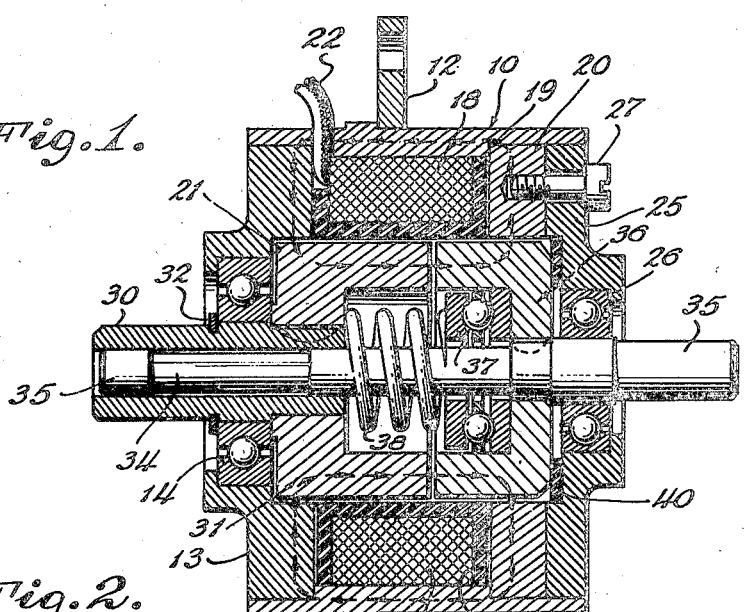

Referring to Fig. 1 of the drawings, the clutch comprises a casing 10 of magnetic material shown with mounting lugs 11 and 12 fixed thereto. One end of the casing is closed by an end piece 13 of magnetic material having a central opening in which a ball bearing assembly 14 is secured.

A solenoid coil 18 is wound on an annular spool or form 19 of suitable insulating material disposed in the mid-section of casing 10 alongside end piece 13. A heavy ring 20 of magnetic material which serves as part of the path for the flux of coil 18 is secured in casing 10 adjacent the opposite end of form 19, the central openings of the form and ring 20 being substantially in register with each other and also register with a recess 21 formed in the inner surface of end piece 13. Cable 22 extending through an opening in casing 10 provides external connections for winding 18.

Figure 2:
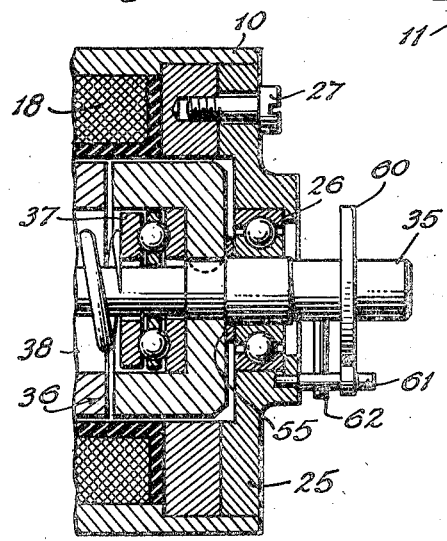
Fig. 2 shows in section a portion of a second modification of a clutch, the parts being in disengaged position.

An end piece 25 of suitable non-magnetic material, having a central opening formed therein, in which is secured a ball bearing assembly 26, serves as a closure for the opposite end of casing 10. The end piece 25, is preferably detachably secured to the assembly by screws 27 which pass through openings in the end piece and which are threaded into openings in ring 20 as shown in Fig. 2.

A hollow shaft 30 of suitable non-magnetic material, such as bearing bronze, is supported for rotation by the ball bearing assembly 14. One end portion of shaft 30 extending outwardly from the clutch structure, may be driven in any suitable manner and forms the input or driving connection for the clutch. The opposite end portion of shaft 30 extends a short distance into the interior of the casing, and on the latter end portion a cup-shaped member 31 of magnetic material is coaxially secured. The cup-shaped member is positioned partly within recess 21 in the end piece 13, and the rim or edge portion thereof extends well within the central opening of form 19 on which the coil 18 is wound. The cup-shaped member is supported to turn clear of the parts just described attached to casing 10.

It will be understood that shaft 30 and cup-shaped member 31 are so mounted as to have substantially no movement with respect to the assembly in an axial direction. A snap washer 32 is disposed in a suitable groove in shaft 30 to limit the axial movement thereof toward the right of the drawing.

A shaft 35 of suitable non-magnetic material, such as stainless steel has one end portion supported for rotation within the central bore of hollow shaft 30 which serves as one bearing therefor. The opposite end portion of shaft 35 is supported by bearing 26 in end piece 25, and this latter end portion which projects outward from the assembly may be considered to be the driven or output shaft of the clutch. Shaft 35 is arranged to have limited axial movement in its bearings as will be described. In order to decrease friction between shafts 30 and 35, when no anti-friction bearings are provided therebetween, a portion 34 of the latter may be formed with smaller cross section to reduce the contact area between these shafts as shown in Fig. 1.

Fixed in any suitable manner to shaft 35, so as to be axially movable therewith, is a cup-shaped armature 36 of magnetic material which cooperates with the cup-shaped member 31, just described, when winding 18 is energized. Armature 36 is partially enclosed within the central openings of ring 20 and winding 18, the rims or edges of the cup-shaped members being disposed adjacent and in register with each other.

A thrust bearing 37 disposed within the central cavity of member 36 is supported thereby clear of shaft 35 which passes therethrough. One end of a compression spring 38 surrounding shaft 35 and disposed within the respective cup cavities presses against cup-shaped member 31, while the opposite end of the spring presses against thrust bearing 37, the spring being effective when the winding 18 is deenergized to displace the armature axially away from the member 31. This axial movement of the armature is limited by end piece 25, or more specifically, by a ring 40 of friction material disposed between end piece 25 and the base of armature 36. In the embodiment of the invention shown in Fig. 1, ring 40 is fixed preferably to end piece 25. When armature 36 is pressed against the friction ring 40, the armature and also its shaft 35 are frictionally locked against rotation. Shaft 30 is then free to rotate, as thrust bearing 37 permits spring 38 to turn freely therewith without imparting a torque to armature 36.

When winding 18 is energized, from any suitable source of potential (not shown) the cup-shaped member 31 and the armature become magnetized and the armature is instantly displaced in an axial direction toward the left of the drawing against the force of spring 38, and the edge thereof engages the edge of cup-shaped member 31 and magnetically locks thereto thus coupling input shaft 30 with output shaft 35.

A highly efficient magnetic circuit is provided for armature 36 which ensures effective operation of the device with a relatively small coil structure. The magnetic circuit, which is indicated by small arrows in Fig. 1, is symmetrical, and includes ring 20, casing 10, end piece 13, cup-shaped member 31 and the corresponding cup-shaped armature 36, all of which are of magnetic material. When the winding 18 is deenergized, the edges of the armature and member 31 are only slightly spaced, say .005 or .010 of an inch. Due to this small space and the relatively narrow edges of the armature and the cup-shaped member with respect to the remainder of the magnetic circuit, when the winding is energized, a strong flux is concentrated across the gap between these elements, so therefore the clutch may be actuated by a winding having a comparatively few ampere turns. The use of non-magnetic material for end piece 25 is to confine the magnetic circuit to the above-mentioned magnetic members and to prevent the possibility of differential magnetic action on armature 36.

Figure 4:
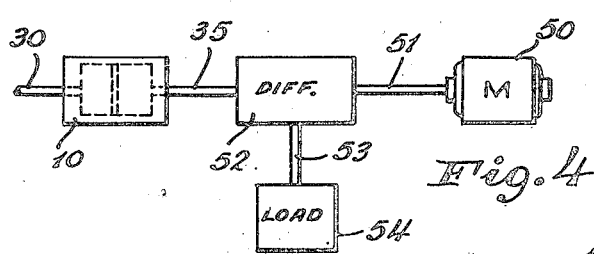
Fig. 4 is a diagram illustrating one use for the clutch of Fig. 1.

The clutch just described is particularly useful in an arrangement shown in the diagram of Fig. 4, where a motor 50 continuously drives the input shaft 51 of a differential mechanism 52 having an output shaft 53 which in turn drives a load 54 coupled thereto. The second input for the differential is actuated by output shaft 35 of a clutch similar to that of Fig. 1 which has an input shaft 30. Assuming that the requirements of the mechanism are such that shaft 35 is to be intermittently operated while shaft 30 continues to turn, then each time the clutch magnet is deenergized, shaft 35 will be locked to the casing 10 while the clutch input shaft 30 will be free to turn. Since shaft 35 is held against rotation, motor 50 will actuate output shaft 53 of the differential as required. If shaft 35 were free when declutched, as would be the case if a conventional clutch were used, then due to the restraint of the load 54 on shaft 53, the latter shaft would remain stationary while shaft 35 would be idly driven by the motor.

The embodiment of the invention shown in Fig. 2 is basically the same as that of Fig. 1. The difference between them is that the friction ring 40 is omitted in the embodiment of Fig. 2, and in its stead a small washer 55 is disposed on shaft 35 to act as a spacer between armature 36 and the inner portion of the ball bearing assembly 26. The operation of the latter embodiment can be understood by inspection of the drawing. When the clutch magnet is deenergized, spring 38 presses the armature against washer 55 which rests against the bearing 26 and serves as a back stop for the armature holding it away from the end piece and permitting free rotation thereof, together with the shaft 35. The embodiment of Fig. 2 operates in the same manner as that of Fig. 1 when the clutch magnet is energized.

Figure 3:
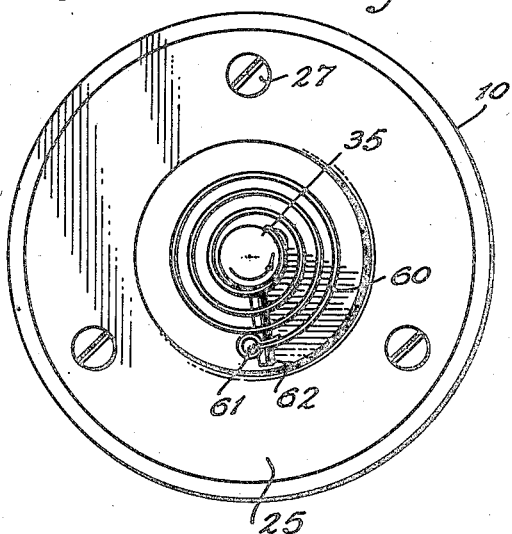
Fig. 3 is an end view of the clutch of Fig. 2.

The clutch per se as just described may be used as a conventional clutch, but for a specific application in a computing device, the clutch may be further modified by providing shaft 35 with a spring 60 for the purpose of restoring the same to an initial or zero position instantly on the deenergization of the winding 18, the device being used in connection with an arrangement (not shown) for measuring angular displacement with respect to time. Referring to Figs. 2 and 3, the inner end of spiral spring 60 is fastened to shaft 35, while the outer end is secured to a post 61 mounted on end piece 25. Spring 60 yieldingly holds an arm 62 fixed to shaft 35 against post 61 when winding 18 is deenergized. This is the zero displacement position for the shaft. When the winding is energized, and assuming that shaft 30 is turning in the direction indicated by the arrow in Fig. 3, then shaft 35 will be displaced thereby, until the winding is deenergized when spring 60 will snap shaft 35 back to its initial or starting position, shown in Fig. 3.

The maximum angular displacement of shaft 35 in the arrangement shown in Figs. 2 and 3 is less than 360 degrees which is adequate for the purpose of the device.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

A clutch comprising a cylindrical casing of magnetic material, an annular winding fixed within the casing, an end piece of magnetic material disposed adjacent one side of the winding in one end of the casing having a central bearing opening formed therein, a ring of magnetic material disposed within the casing at the opposite side of the winding having a central opening substantially in register with that of the winding, a second end piece of non-magnetic material closing the opposite end of the casing having a central opening therein, a tubular shaft supported for rotation in the first-mentioned bearing opening, a cup-shaped member of magnetic material disposed partly within the winding coaxially fixed to the tubular shaft, a shaft disposed in the second-mentioned bearing opening and extending into the central bore of the tubular shaft jointly supported thereby for rotary and axial movement, a cup-shaped magnetic armature fixed to the latter shaft and disposed partly within the winding, the elements specified as being of magnetic material being arranged to form a highly efficient symmetrical magnetic circuit for the winding, spring means located in the cavity formed by the armature and member tending to displace the armature away from the member in an axial direction, said winding being effective on the energization thereof to bring the armature and member into engagement and magnetically couple the same.

ROBERT F. GARBARINI.
ROBERT S. EDWARDS.

REFERENCES CITED

The following references are of record in the file of this patent:

UNITED STATES PATENTS

| Number | Name | Date |
|---|---|---|
| 2,133,228 | Le Vesconte | Oct. 11, 1938 |
| 2,180,412 | Hart | Nov. 21, 1939 |
| 2,236,652 | Shurts et al. | Apr. 1, 1941 |
| 2,401,003 | Lear | May 28, 1946 |